United States Patent [19]
Glitho

[11] Patent Number: 6,065,130
[45] Date of Patent: May 16, 2000

[54] IMPLEMENTING COUNTERS IN A SYSTEM WITH LIMITED PRIMARY MEMORY

[75] Inventor: Roch Glitho, Montreal, Canada

[73] Assignee: Telefonaktiebolaget LM Ericsson, Stockholm, Sweden

[21] Appl. No.: 08/980,732

[22] Filed: Dec. 1, 1997

[51] Int. Cl.[7] .................................................. G06F 11/30
[52] U.S. Cl. ......................................................... 713/502
[58] Field of Search ............................................ 713/502

[56] References Cited

U.S. PATENT DOCUMENTS

| | | | |
|---|---|---|---|
| 4,219,875 | 8/1980 | Templeton | 364/200 |
| 5,247,674 | 9/1993 | Kogure | 395/650 |
| 5,426,741 | 6/1995 | Butts, Jr. et al. | 395/325 |
| 5,537,541 | 7/1996 | Wibecan | 395/183.21 |
| 5,657,253 | 8/1997 | Dreyer et al. | 364/551.01 |
| 5,881,224 | 3/1999 | Ranson et al. | 714/47 |

FOREIGN PATENT DOCUMENTS

0742519A2  11/1996  European Pat. Off. .

OTHER PUBLICATIONS

Luis–Felipe Cabrera and Eric Jul; "IEEE Proceedings Second International Workshop on Object Orientation in Operating Systems"; Sep. 24–25, 1992, pp. 245–261.

Douglas Comer; "Operating System Design, The XINU Approach", Chapter 8, pp. 101–107.

Andrew S. Tanenbaum; Operating Systems Design and Implementation; Chapter 2, pp. 62–63.

*Primary Examiner*—Thomas M. Heckler
*Attorney, Agent, or Firm*—Smith & Danamrai, P.C.

[57] ABSTRACT

A system and method for efficiently managing the primary memory of a processing system such as a general purpose computer system or a telecommunications network by increasing the amount of primary memory available for subscriber allocation through the use of a general purpose counters block (GPCB). The GPCB is divided into an event-map block that assigns event detectors to counters, an event-instructor block which activates the event detectors, an event-indication receiver for receiving signals from the event detectors, an assign/counter that activates general purpose counters, and general purpose counters for incrementing, storing and reporting event count information. The system also provides for designating the general purpose counters to monitor selected events in programs. The events can be monitored on an individual basis or in groups. In addition, a user interface is provided that uses an event-type selector to pick the events the system operator wishes to monitor, and a subscriber selector for indicating which subscribers should be monitored to see if a selected event occurs. The user interface includes a counter report which receives error messages from the counters and reports the errors to the operator terminal.

28 Claims, 5 Drawing Sheets

IMPLEMENTING COUNTERS IN A SYSTEM WITH LIMITED PRIMARY MEMORY

BACKGROUND OF THE INVENTION

1. Technical Field of the Invention

This invention relates to memory allocation and, more particularly, to a system and method for implementing counters in the primary memory of a computer system or telecommunications network.

2. Description of Related Art

Computer systems (or "the system") and telecommunications networks (or "the network") use memory to store information such as programs and data. Memory typically comprises secondary memory and primary (or main) memory. Secondary memory encompasses storage devices such as hard drives, tapes, and diskettes, and is more stable and less expensive per unit of storage than the Random Access Memory (RAM) of primary memory. Accordingly, secondary memory is favored for long-term data and program storage. Primary memory is mostly comprised of RAM, which is memory that directly stores information on computer chips. RAM usually stores a program or data only while that program is running or that data is needed. Then, once the user exits the program, or a program no longer needs the reserved data space, new information may "overwrite", or be stored in place of, the program or data once stored in RAM. In addition, if the computer is turned off, the information in the RAM is erased and is no longer exists. However, a computer system or telecommunications network can store and retrieve information in RAM much more quickly than it can store or retrieve data from secondary data devices, which means that programs run much more smoothly from RAM than from secondary memory. Thus, the executable code (which is the code in a program that controls the network or the system functions) of practically all programs is run from primary memory RAM. To simplify the remaining discussion, unless otherwise indicated, any reference to primary memory means the RAM of primary memory.

An operating system of a computer or a telecommunications network manages data transfers between the devices of a computer system or telecommunications network. One such data transfer moves the executable code of a software program to be run (or executed) from a secondary memory storage device to a portion of the primary memory available in a computer system or telecommunications network.

FIG. 1 is a graph of primary memory volume allocated as a function of time illustrating an attempt to load three programs 1–3 into primary memory over some undefined period of time. Primary memory is represented by the vertical axis and time is represented on the horizontal axis. As indicated by the Primary Memory Available line 4 on the graph, primary memory is generally a fixed resource, meaning that to increase primary memory additional primary memory must be purchased.

Typically, when allocating the primary memory, the operating system detects the amount of primary memory available and estimates the maximum amount of primary memory needed to run (as opposed to merely store) the executable code of the program. If adequate primary memory exists to run the executable code, the operating system allocates and reserves the appropriate amount of primary memory to insure that the program will run and then manages the loading of the executable code into primary memory.

Each new program loads while a previously loaded program is still running, that is to say, without exiting out of any previously loaded program. As long as the executable code of a first program located in its allocated primary memory is running, no other program can access or be assigned the primary memory space designated for that first program.

Because no other program can access or be assigned primary memory that is already allocated to another program which is still running, the allocation of primary memory by the operating system, as graphed in FIG. 1, takes the appearance of vertical steps as the first program 1 and then the second program 2 are loaded. However, if there is not enough primary memory available to run the executable program code of the third additional program 3, the operating system must either send an Ainsufficient memory@ error or dynamically use secondary memory to store a portion of the executable code, and load only some essential portion of the executable code into primary memory, which considerably slows down program execution. The diagonal lines of program 3 indicate that program 3 cannot be loaded because there is not adequate primary memory available.

In general, the executable code of a program comprises commands organized in groups of related code called blocks. Each block of code performs a specific function. One common block of code is called a counter.

U.S. Pat. No. 4,219,875 to Templeton (Templeton) discusses the operative steps required to implement generally accepted counting functions. A counter may automatically increment a number in storage, waiting until the stored number is incremented to a predetermined value to report that the predetermined value has been reached. Alternatively, the counter may report the number it is storing. Today, lines of software code replace the hardware devices of Templeton, but the required functional steps are the same.

FIG. 2 is a flow chart illustrating the steps of an existing counting function. First, an event is detected by the program in a detecting step 10. The program then, in a reporting step 12, reports the event to the designated counter for that event. The counter then increments the number it is storing in an incrementation step 14. In a storing step 16, the new value is saved to memory. Next, the counter executes a matching step 18 to see if the new number matches a predetermined value, if any. If the number matches the predetermined value, a report is made to the appropriate part of the program in a reporting step 20. If the number is less than the predetermined value, the program enters a waiting step 22 until the next event is detected, as in the detecting step 10. In contemporary systems every event being monitored uses a separate counter block in the code of a program.

Examples of using counters to monitor events are found in the telecommunications industry, and in particular, in radio telecommunications systems. For example, counters detect and prevent fraud in the telecommunications industry by monitoring the number of unsuccessful attempts at accessing an account, such as through the incorrect entry of a personal identification number (PIN). A large count of unsuccessful attempts at accessing an account could indicate an attempt to steal access to that account, thus warning the system operator to investigate the situation. Also in the telecommunications industry, counters monitor the number of calls made by customers in specific locations within specific time frames. With this information a system operator can formulate a marketing plan or create incentives to fill low use periods and decongest crowded periods.

Unfortunately, there is a substantial shortcoming with the current approach to monitoring events with counters. As applied to the telecommunications industry, existing systems use a separate counter in the software of each program to monitor each event for each system subscriber. Because a separate counter is implemented to monitor each event one wishes to track, the primary memory space allocated for counters in primary memory to run a modern telecommunications network program is substantial, often requiring millions of counters for a typical network. By way of illustration, monitoring just twenty events for fifty thousand subscribers requires that space for one million counters be allocated in memory, whether or not all twenty events are actually relevant for all of the users. In addition, the number of counters needed is estimated by industry experts to grow at least ten-fold in the near future, as the need for more and varied information grows.

Coping with large numbers of counters in each program is compounded by the large numbers of people subscribing for additional telecommunications services, such as cellular phone, data and facsimile lines. The proliferation of these devices has greatly increased the number of attempts by users to access telecommunications networks. As the number of user attempts to access the telecommunications network increases, more program space, and subsequently, more counters, attempt to load into primary memory. Should network demand exceed the amount of primary memory available, telecommunications systems operators are unable to count desired events.

One approach to dealing with the demands placed on primary memory is to physically increase the amount of primary memory available. However, this option is very expensive not only because of the high price of memory, but also because of the additional facility space, hardware, and support staff required to implement the additional primary memory. Running programs from secondary memory has also been suggested by Douglas Comer in his book *Operating System Design, The Xinu Approach*, but secondary memory access is slow and still requires additional facility space, hardware, and support staff.

While the foregoing discussion concerns the telecommunications industry, it is understood that the discussion is not so limited. Rather, it will be readily apparent that the discussion contemplates the problems encountered with storing executable code in primary memory used in other electronic media, such as computer systems.

In order to overcome the disadvantage of existing solutions, it would be advantageous to have a system and method of dynamically assigning counters to count different events in a computer system or telecommunications network. Such a system would increase the amount of primary system memory available to run additional programs and would do so without eliminating any functional aspects of a program. The present invention provides such a system.

SUMMARY OF THE INVENTION

The present invention provides a system that allocates primary memory to provide general purpose counters and other software blocks and provides a system of dynamically assigning counters, individually or in groups, to monitor selected events occurring in the code of a program. By implementing counters on a selected basis, less overall counter space is reserved in the primary memory of a computer system or telecommunications network, resulting in more primary memory space being available for loading more programs into the primary memory of a computer system or telecommunications network.

In one aspect, the present invention is a system for implementing a General Purpose Counters Block (GPCB) comprising primary memory wherein a predetermined amount of the primary memory is allocated as designated primary memory, and counters are located in the designated primary memory for incrementally monitoring events. The present invention includes a user interface for selecting at least one event in at least one program to be counted wherein the programs are selected individually, or as a group. The user interface may be a Graphical User Interface or a Man-Machine Interface.

Another aspect of the present invention provides a system for implementing a General Purpose Counters Block comprising five parts: first, primary memory wherein a predetermined amount of said primary memory is allocated as designated primary memory; second, counters located in the designated primary memory for incrementally monitoring events; third, logic with knowledge of the location of an event detector block in a program; fourth, means for sending a message to the event detector block to report detected events; and fifth, means for receiving messages from the event detector blocks which report the detected events. The present invention may also include a user interface for selecting at least one event in at least one program to be counted, the programs being selected individually or as a group.

In another aspect, the present invention is a method of implementing a General Purpose Counters Block in a processing system comprising the steps of selecting a predetermined amount of primary memory to be allocated as designated primary memory and placing counters in the designated primary memory for incrementally monitoring assigned events. The method further comprises the step of selecting at least one event and at least one program to be counted, where the system operator selects the programs individually, or as a group.

Another method of implementing a General Purpose Counters Block comprises selecting a predetermined amount of primary memory to be allocated as designated primary memory, placing counters in the designated primary memory for incrementally monitoring events, determining the location of an event detector block in a program, sending a message to the event detector block to report detected events, and receiving messages from the event detector blocks which report detected events. The method may further comprise the step of utilizing a user interface to select at least one event in at least one program to be counted where programs to be counted are selected individually or as a group.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention provides a general purpose counter system and method for efficiently managing the primary memory of a processing system which may comprise a general purpose computer system or telecommunications network, thereby increasing the amount of primary memory available for program allocation. The system and method first allocate a portion of primary memory to provide a General Purpose Counters Block (GPCB) which is divided into general purpose counters and other blocks of code needed to receive and send event information to specific event-detection blocks. The general purpose counter system also provides for a user interface for designating the general purpose counters to monitor selected events in programs. The events can be monitored individually or in groups.

Figure 1:
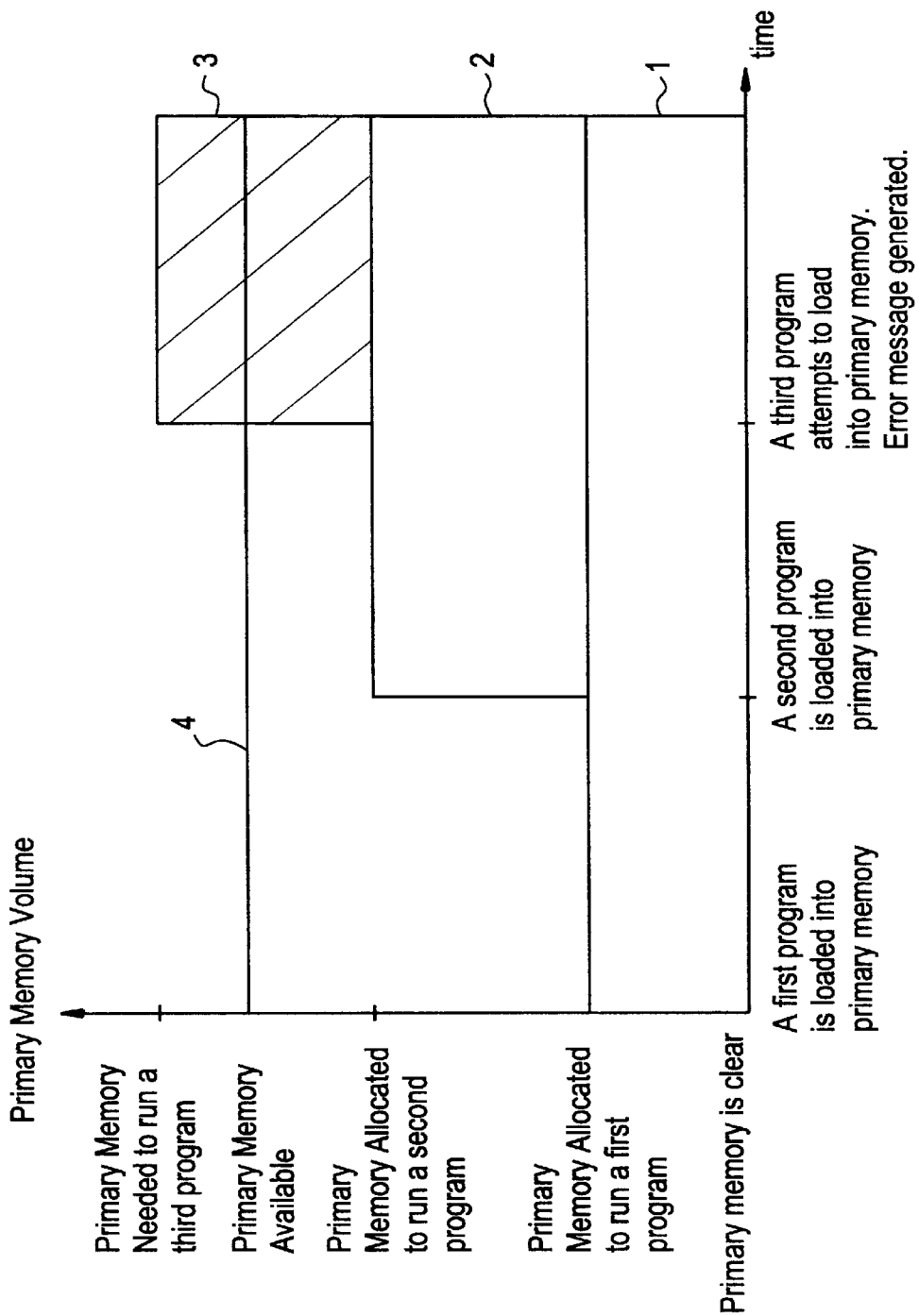
FIG. 1 (Prior Art) is a graph of primary memory volume allocated as a function of time illustrating an attempt to load three programs into primary memory over some undefined period of time.
Figure 2:
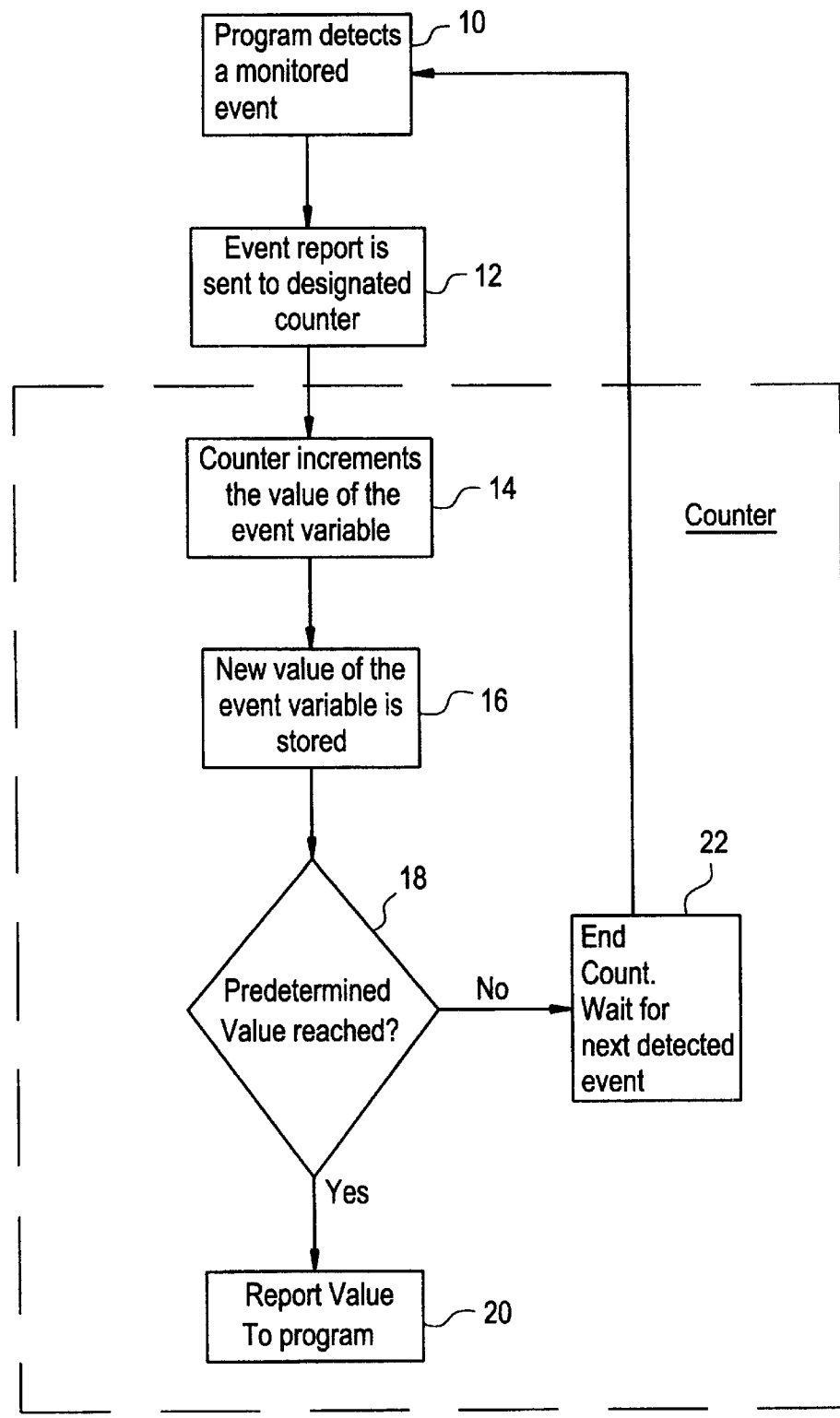
FIG. 2 (Prior Art) 2 is a flow chart illustrating the steps of an existing counting function.
Figure 3:
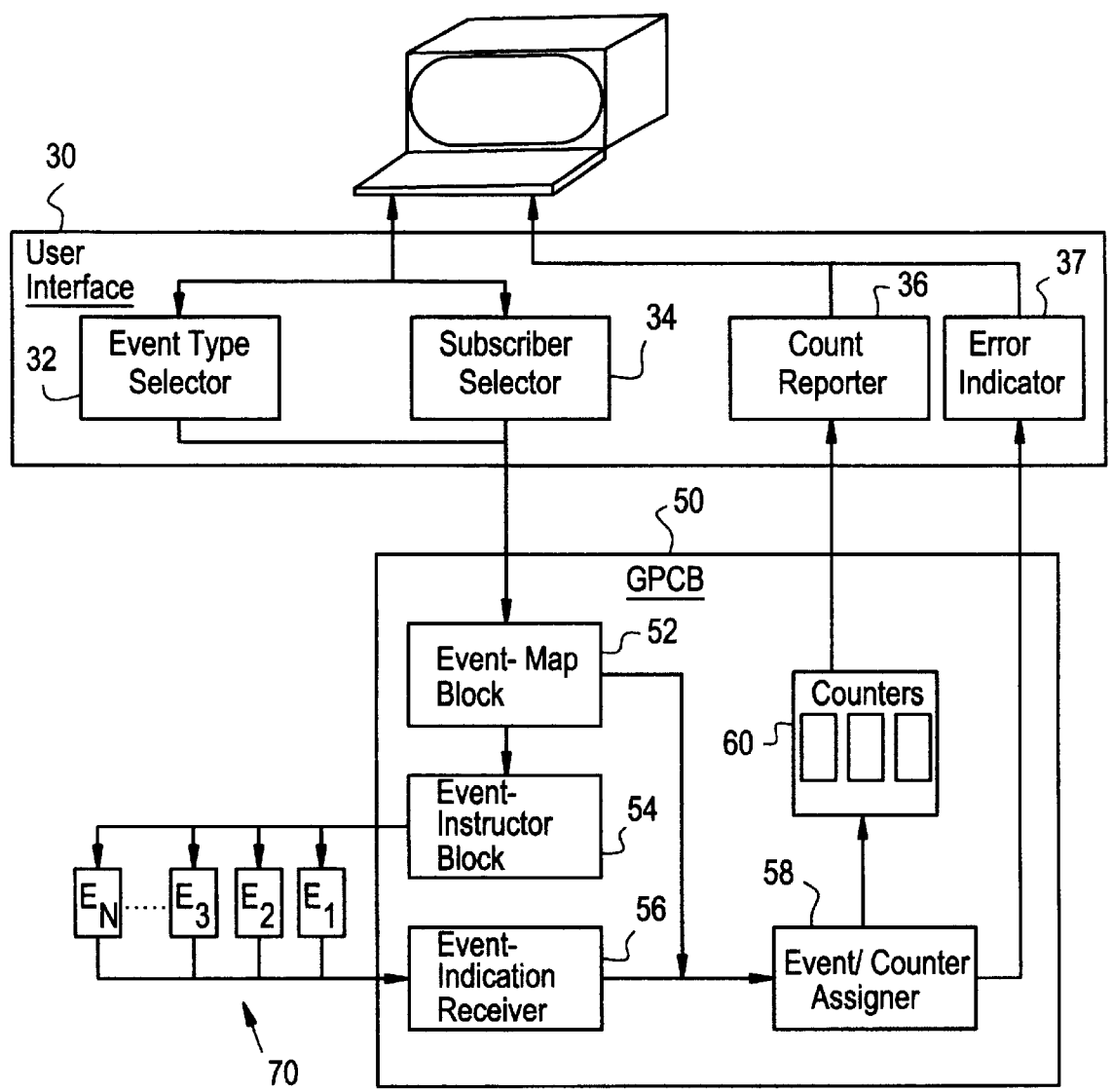
FIG. 3 is a block diagram that illustrates the interactions of the components of the present invention.

FIG. 3 is a block diagram that illustrates the interactions of the components of the present invention. A general purpose counter system generally comprises a user interface 30 and a GPCB 50 which is located in primary memory. The user interface 30 may comprise either a graphical user interface (GUI) or a man-machine interface (MMI). The user interface 30 provides the system operator with the ability to select the types of events which are to be monitored with a event-type selector 32, and also gives the system operator the ability to select the subscribers for whom the operator wants to monitor the selected events with a subscriber selector 34. The user interface also accepts count information from counters 60 and reports that information to the system operator through the use of a count reporter 36. In addition, if the number of events and/or subscribers entered by the system operator requires more memory than is available, an error indicator 37 sends an error indication to the operator.

The GPCB 50 typically comprises an event-map block 52, an event-instructor block 54, an event-indication receiver 56, an event/counter assigner 58, and counters 60. In a computer system or telecommunications network a user selects a portion of the primary memory to be reserved for the GPCB. Within the GPCB, a portion of the primary memory is allocated for general purpose counters 60. The general purpose counters 60 differ from contemporary counters because the general purpose counters are programmable, and the general purpose counter, at the command of the user interface 30, can be changed to monitor a different event or program. The event-map block 52 accepts information from the user interface 30 concerning which events and subscribers are to be monitored and, utilizing internal logic, matches the information with the known location of the event detectors 70 ($E_1$ through $E_n$). Using this information for a given event, the event-instructor block 54 prompts the selected event detector 70 to report when the event is detected. Event detectors 70 may be programed in the code of various programs through the computer system, and are pre-programmed to send, when programmed events are detected, an event indication signal to the event-indication receiver 56. The event-indication receiver 56 receives the signal that the event has occurred from the event detector 70, determines what event has occurred, and informs the event/counter assigner 58. The event counter-assigner 58 stores the location of the general purpose counter 60 for each event being monitored, matches this information with the event that has been detected, and then instructs the appropriate counter 60 to increment accordingly.

To take full advantage of a general purpose counter system, it is desirable to modify the program code. Program code comprises many software blocks, one such block being an event detector 70. An event detector 70 monitors a variable, and when a change is detected indicating that the monitored event has occurred, the event detector 70 signals the appropriate counter to increment its value. Because not all events in a program, or even all programs, are being monitored in a computer system or telecommunications network which uses a general purpose counter block, it saves processing time if these functions can be turned off or ignored by the program until an event report is desired. Accordingly, the user interface effectively provides a means for activating and deactivating the event detectors 70 in program code. In addition, it should be obvious that by providing the general purpose counter system, it is intended that the standard counter blocks in the body of the program should be eliminated.

Figure 4:
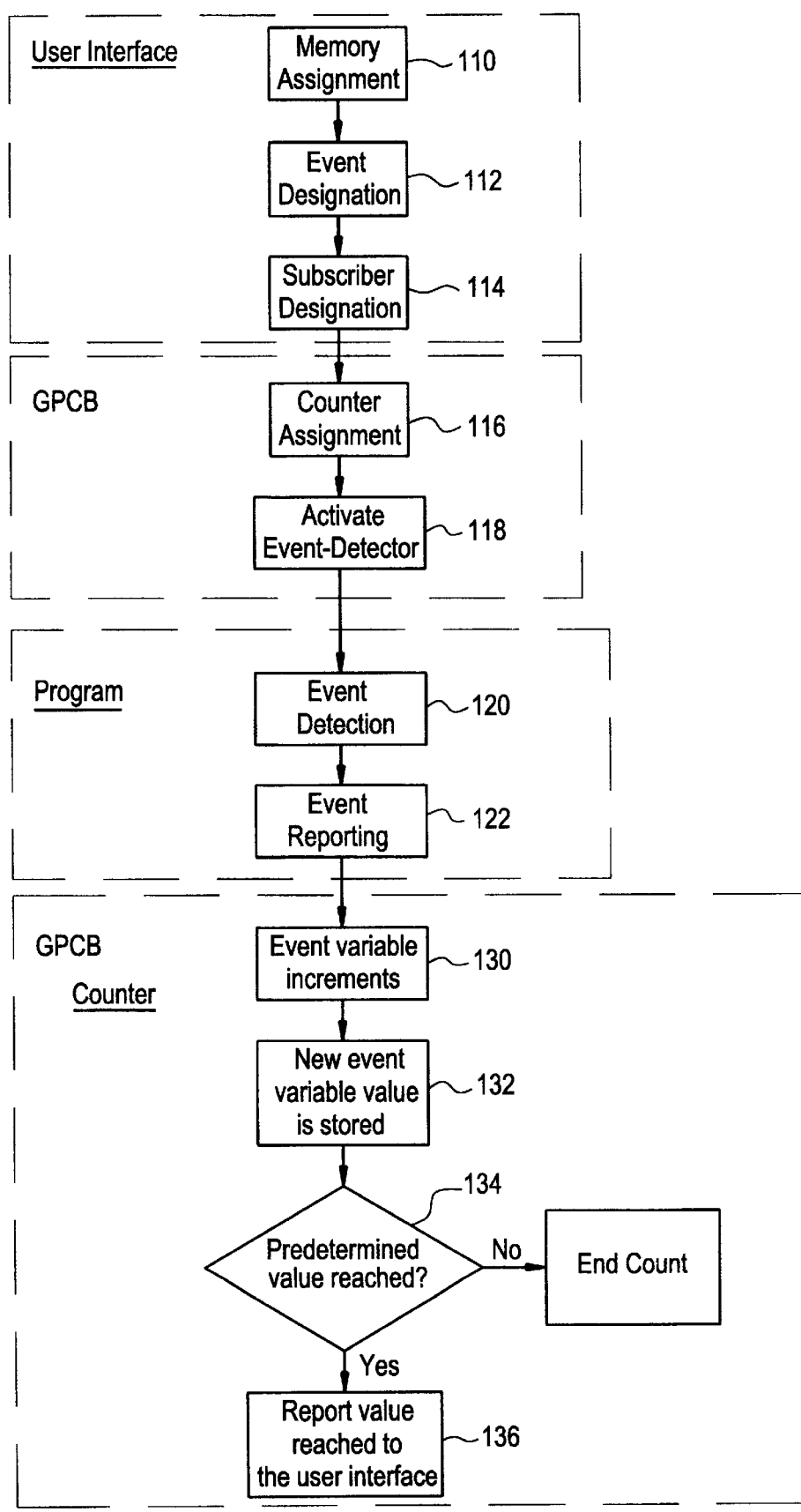
FIG. 4 is a flow chart which illustrates generally the functional steps of the present invention.

FIG. 4 is a flow chart which illustrates generally the functional steps of the general purpose counter system of the present invention. With reference to FIGS. 3 and 4, the method will now be described. First, an operator uses the user interface 30 to designate a portion of the primary memory calculated to be needed to accommodate the number of events and programs which are to be counted in a primary memory designation step 110. The operator then designates the events which he desires to monitor in an event designation step 112, and selects the subscribers for which these events are to be monitored in a subscriber designation step 114. The system operator selects subscribers in the context of a telecommunications network. For a general purpose computer system, the system operator selects programs to monitor. It should be appreciated that the two steps 112 and 114 can be reversed. Once the operator has selected the events and subscribers to monitor, the event/counter assigner 58 assigns specific general purpose counters 60 in the GPCB to monitor the specific events in a counter assignment step 116. This assignment can be made on a per-subscriber basis or by selecting groups of subscribers to monitor simultaneously. If the number of events and/or subscribers entered by the operator requires more memory than is available, the operator receives an error indication from the error indicator 37. The event/instructor block 54 also instructs the event detectors in the selected programs to send indications of the occurrence of a monitored event to the event indication receiver 56 in an event instruction step 118.

When a monitored event occurs, the event detector block 70 in the monitored program detects the event in a detection step 120 and then in a reporting step 122 reports the occurrence of that event to the event indication receiver 56.

When the general purpose counter 60 monitoring the event receives the indication that a monitored event has occurred, the event variable increments in an incrementation step 130 and the new value of the event variable is stored in a saving step 132. Once the new variable is stored, that value may be compared to a pre-selected variable value in a comparison step 134, and if the values are equal, the counter will report the value to the user interface in a reporting step 136. Otherwise, if the counter value is still lower than the pre-determined value, the counter will enter a waiting stage.

Figure 5:
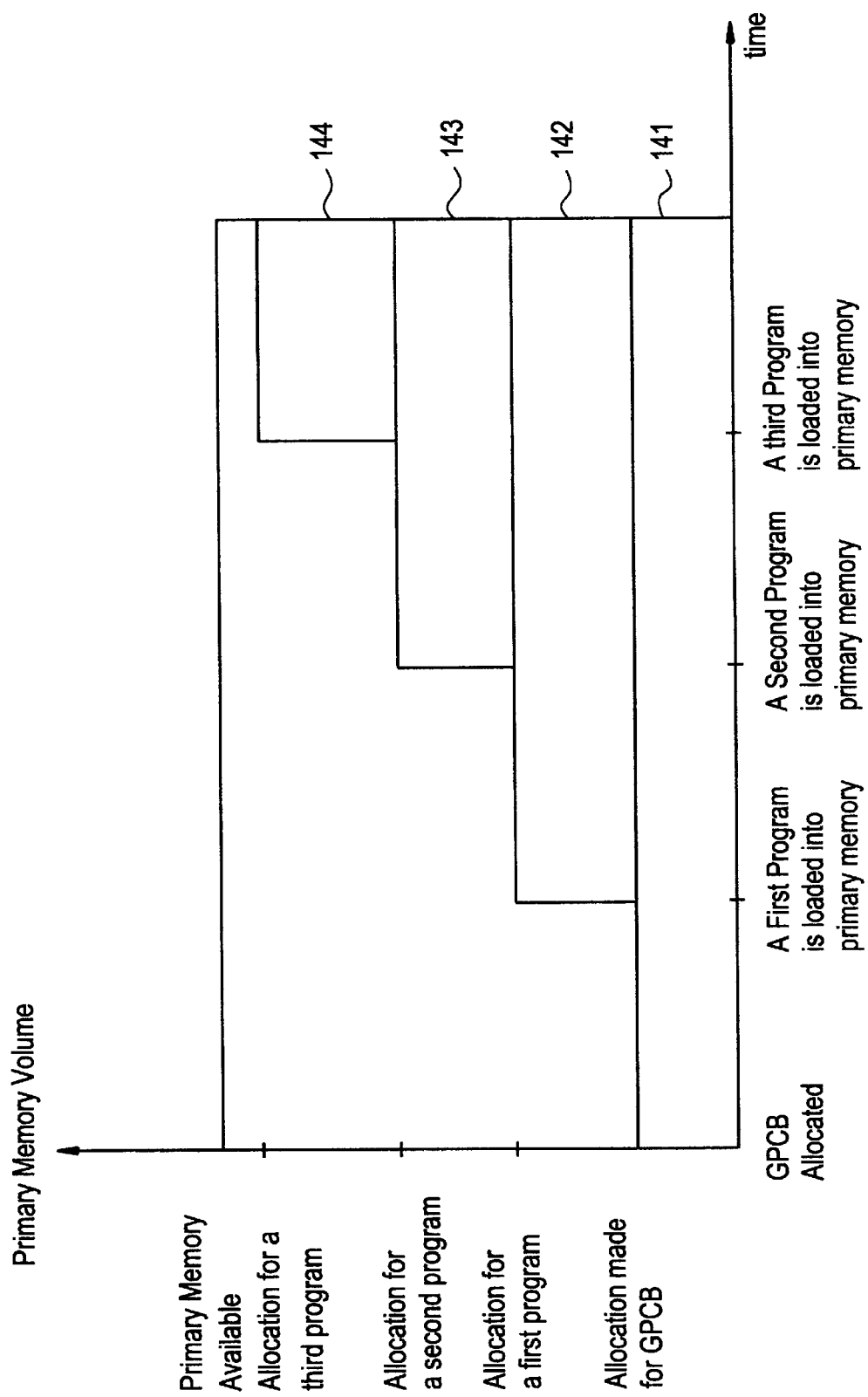
FIG. 5 illustrates graphically the allocation of primary memory in a processing system employing the General Purpose Counters Block of the present invention.

FIG. 5 illustrates graphically the allocation of primary memory in a system employing the general purpose counters system of the present invention. A portion of memory is allocated by the user as GPCB space 141 and is unavailable for other programming activities. Once the user has selected the events and programs to be monitored, each program is loaded in the usual manner. However, each of the programs is smaller than programs without general purpose counter allocation. Over time, as each additional program 142–144 is loaded into primary memory, less primary memory is utilized for loading all programs because more memory space is saved by eliminating counters in programs 142–144 than is reserved by the GPCB 141.

Not all users of telecommunications networks and computer systems are subject to fraud, therefore it is not necessary or desirable to monitor all user events which might indicate a security breach. Additionally, since consumers differ widely in behavior and use patterns, it is not cost effective to record all data stored by every counter concerning every event monitored for every user to collect marketing data. Thus, many, and probably most, counter blocks in existing programs provide information which is unused. Counters which provide unused information offer no benefit and, in fact, occupy processing time and primary memory which could be devoted to other activities. Thus, by implementing the general purpose counter system of the present invention in a computer system or telecommunications network, an operator can eliminate unmonitored event counters from primary memory and unmonitored event blocks from taking valuable execution time. By implementing only the number of counters required to monitored selected events and providing a system for dynamically reallocating those counters, less primary memory space is reserved for counters, resulting in more primary memory space being available for loading more programs into the primary memory of a computer system or telecommunications network.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a processing system having a plurality of functional blocks which detect a plurality of events, a general purpose counters block (GPCB) comprising:

a plurality of programmable counters, each of said counters being separately programmable to count an assigned event;

means for receiving indications from the functional blocks when events are detected; and means for incrementing each programmable counter when an indication is received in the GPCB that the assigned event for that counter has been detected.

2. The GPCB of claim 1 further comprising an event-map block which assigns the functional blocks that detect each of the plurality of events to the counters and stores the assignment.

3. The GPCB of claim 2 further comprising an event-instructor block that sends messages to the identified functional blocks, said messages instructing the functional blocks to register the events and send event indications to the GPCB.

4. The GPCB of claim 1 further comprising an event/counter assigner for reporting the events to the counters.

5. A processing system having a plurality of functional blocks which detect a plurality of events, said processing system comprising:

a general purpose counters block (GPCB) comprising:

a plurality of programmable counters, each of said counters being separately programmable to count an assigned event;

means for receiving indications from the functional blocks when events are detected; and means for incrementing each programmable counter when an indication is received in the GPCB that the assigned event for that counter has been detected; and a user interface through which a system operator controls the GPCB.

6. The processing system of claim 5 wherein the user interface includes a subscriber-selector for selecting subscribers for which the system operator desires to count the selected events.

7. The processing system of claim 5 wherein the user interface includes an event-type selector for selecting the types of events to be counted.

8. The processing system of claim 5 further comprising an event-map block which assigns the functional blocks that detect each of the plurality of events to the counters and stores the assignment.

9. The processing system of claim 5 further comprising an event-instructor block that sends messages to the identified functional blocks, said messages instructing the functional blocks to register the events and send event indications to the GPCB.

10. The processing system of claim 5 further comprising an event/counter assigner for reporting the events to the counters.

11. The processing system of claim 5 wherein the user interface includes means for selecting subscribers individually.

12. The processing system of claim 5 wherein the user interface includes means for selecting subscribers as a block.

13. The processing system of claim 5 wherein the user interface is a Graphical User Interface.

14. The processing system of claim 5 wherein the user interface is a Man-Machine Interface.

15. In a processing system having primary memory and a plurality of event-detector blocks, a General Purpose Counters Block (GPCB) comprising:

a plurality of counters located in a block of the primary memory for incrementally monitoring a plurality of events;

means for identifying a plurality of said event-detector blocks which count each of the plurality of monitored events; and means for receiving a message in the GPCB from each of the plurality of event-detector blocks, said message including an indication of a detected event.

16. The GPCB of claim 15 further comprising a user interface for selecting at least one event and at least one program to be counted.

17. The GPCB of claim 16 wherein the user interface includes means for selecting subscribers individually.

18. The GPCB of claim 16 wherein the user interface includes means for selecting subscribers in a group.

19. The GPCB of claim 16 wherein the user interface includes means for sending an error indication to a user if the user selects a number of events which exceeds the number of counters in the GPCB.

20. The GPCB of claim 16 wherein the user interface is a Graphical User Interface.

21. The GPCB of claim 16 wherein the user interface is a Man-Machine Interface.

22. A method of implementing a General Purpose Counters Block (GPCB) in a processing system comprising the steps of:

allocating primary memory for the GPCB;

assigning counters in the GPCB to incrementally monitor events in a plurality of programs;

mapping a location of an event detector block in each of said plurality of programs;

instructing the event detector block to report when a preselected event occurs;

receiving an indication from the event detector block that a preselected event has occurred; and counting the event in one of said assigned counters in the GPCB.

23. The method of claim 22 further comprising the step of using a user interface to select at least one event and at least one program to be counted.

24. The method of claim 23 wherein the programs are selected individually.

25. The method of claim 23 wherein the programs are selected in a group.

26. The method of claim 23 wherein the step of selecting is accomplished through the use of a Graphical User Interface.

27. The method of claim 23 wherein the step of selecting is accomplished through the use of a Man-Machine Interface.

28. The method of claim 23 further comprising the step of assigning the counters to count an event for a predetermined period of time.

* * * * *